United States Patent
Kim et al.

(10) Patent No.: US 7,733,780 B2
(45) Date of Patent: Jun. 8, 2010

(54) METHOD FOR MANAGING SERVICE BANDWIDTH BY CUSTOMER PORT AND EPON SYSTEM USING THE SAME

(75) Inventors: Jung Hak Kim, Jeonlabuk-do (KR); Tae Whan Yoo, Daejeon (KR); Hoon Lee, Daejeon (KR); Yool Kwon, Busan (KR); Bong Tae Kim, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 638 days.

(21) Appl. No.: 11/634,985

(22) Filed: Dec. 7, 2006

(65) Prior Publication Data

US 2007/0127487 A1 Jun. 7, 2007

(30) Foreign Application Priority Data

Dec. 7, 2005 (KR) ........................ 10-2005-0118805
Mar. 24, 2006 (KR) ........................ 10-2006-0027117

(51) Int. Cl.
G01R 31/08 (2006.01)
H04L 12/28 (2006.01)

(52) U.S. Cl. .................................. 370/235; 370/395.21
(58) Field of Classification Search ........................ None
See application file for complete search history.

(56) References Cited

U.S. PATENT DOCUMENTS 7,327,679 B2* 2/2008 Naor et al. .................. 370/232
7,415,003 B1* 8/2008 Ogura et al. ................. 370/351
7,469,298 B2* 12/2008 Kitada et al. ................. 709/236
7,483,632 B2* 1/2009 Sung et al. ..................... 398/63
2003/0117998 A1* 6/2003 Sala et al. .................... 370/351
2005/0074238 A1 4/2005 Sung et al.
2005/0157721 A1* 7/2005 Rabie et al. .................. 370/392
2005/0243837 A1* 11/2005 Boyd et al. ............. 370/395.52

FOREIGN PATENT DOCUMENTS

KR 10-2005-0032687 4/2005
KR 1020050061263 6/2005

\* cited by examiner

*Primary Examiner*—Hong Cho
*Assistant Examiner*—Eunsook Choi
(74) *Attorney, Agent, or Firm*—Lowe Hauptman Ham & Berner LLP

(57) ABSTRACT

A method for managing a service bandwidth by a customer port and an EPON system using the same are provided. In order to manage the service bandwidth by a customer, ONU and ONT allocate a service class according to a combination of information about a customer that receives a service, and a service type and a service priority of a service provided to a customer, allocate a bandwidth according to each service class and control a uplink bandwidth or a downlink bandwidth according to a service class. Also, a system manger collects information about a service provider, a service provided from a service provider, a customer that receives a service, and information for classifying a service. After collecting, the system manager provides the collected information to the ONU and the OLT.

21 Claims, 9 Drawing Sheets

| Destination MAC Address | Source MAC Address | Length/Type | DATA | FCS |

FIG. 10

METHOD FOR MANAGING SERVICE BANDWIDTH BY CUSTOMER PORT AND EPON SYSTEM USING THE SAME

RELATED APPLICATION

The present application is based on, and claims priority from, Korean Application Number 2005-118805, filed Dec. 7, 2005, and Korean Application Number 2006-27117, filed Mar. 24, 2006, the disclosure of which is hereby incorporated by reference herein in its entirety.

BACKGROUND OF THE INVENTION

1. Field of the Invention

The present invention relates to an Ethernet passive optical network (EPON), and more particularly, to a method for managing a service bandwidth by a customer port and an EPON system using the same for controlling a bandwidth dynamically according to a service provided through the EPON system.

2. Description of the Related Art

As next generation access network technology for providing a communication and broadcasting integrated service and a fiber to the home (FTTH), passive optical network (PON) technology has been receiving an attention. The PON technology has an advantage of a broadband service that can accommodate voice, data and broadcasting at the same time in an access network which has been suffered for the bottle neck problem. It is expected that the PON technology will contribute for constructing and popularizing a digital home. Especially, an Ethernet based PON (EPON) occupies 95% of Internet traffic. Hereinafter, standard progress, technical features, economic benefits of the EPON will be described.

The standardization of the EPON has been in progress by IEEE 802 LAN/MAN standard committee. As recently decided access network technology, three types of wired lines such as a point-to-point copper wire, a point-to-point optical cable and a point-to-multipoint optical cable have been used. The EPON provide 1 G of a transmit rate, 1:16 of a divergence rate, and 10/20 Km of a target transmission distance.

The EPON has a point-to-multipoint network structure and uses a passive optical distribution unit. The EPON does not require active elements such as a reproducing device and an amplifying device, minimizes the use of an optical cable and reduces optical ports in a center office. That is, the EPON is a passive optical access network allowing easy and economic management. The EPON may be an affordable plan for building a FTTH based or a fiber to the business (FTTB) based access network in the case of a new apartment where an optical cable is installed.

Hereinafter, a conventional EPON system will be described with reference to an accompanying drawing.

FIG. 1 is a block diagram of a conventional EPON system.

Referring to FIG. 1, the EPON system according to the related art includes an optical line terminal (OLT) 10 for accessing service providers and networks used by the service providers 11 to 1N, and optical network units ONU 31 to 3N for accessing a user. The ONU is similar to an optical network terminal (ONT) 40 which a similar structure of a typical MODEM. However, the ONT 40 is distinguished from the ONU because the ONT 40 provides a connecting means to user to allow a user to directly access the ONT. Also, the EPON system includes an optical distribution network (ODN) 20 for distributing a physical link to a plurality of links in order to enable a plurality of ONUs/ONTs to connect a signal physical link provided by the ONT.

As shown in FIG. 1, the EPON system provides a logical link identifier (LLID) for logically discriminating the ONU from the ONT. The ONUs 31 to 3N and the ONT 40 provide a media access control address (MAC) in order to access the OLT 10. The OLT 10 provides a means for identifying the ONUs 31 to 3N and ONT 40 by mapping the MAC addresses of the ONUs 31 to 3N and the ONT 40 to the LLID, and provides the MAC addresses to the ONUs 31 to 3N and the ONT 40. The OLT 10 provides a means for physically detecting equipment used by a service provider or other network equipment used by the service provider to access the OLT 10. Also, the ONU 31 to 3N and the ONT 40 provides a means for physically recognizing equipment used by a customer.

As shown in FIG. 1, a service provider provides a service through the EPON system and also provides a means for recognizing a type and a feature of a provided service. That is, the service provider recognizes the type and the feature of the service requested by a service application terminal and provides corresponding services according to the recognizing result. The EPON system and the service provider may set rules for services and may control or manage the service passing through the EPON system according to the rules.

The EPON provides a limited bandwidth for delivering a service. The limited bandwidth of the EPON is not sufficient to deliver recently introduced various services. Therefore, it is required to control the bandwidth for using a service or receiving a service based on a contract made by the EPON system, a service provider and a customer.

The conventional EPON treats a service itself more importantly than a customer connected to an ONU or an ONT. That is, in a view of quality of service (QoS), a service is classified into a plurality of levels, and the bandwidth and transmission delay are controlled according to the level of the service. Recently, various types of services were introduced and become popular among people. Therefore, it is recognized that the bandwidth provided from the EPON is very limited to accommodate such various services. Due to the limited bandwidth of the EPON, it requires a means for controlling a service bandwidth not only according to QoS but also according to a service policy.

In order to satisfy such a requirement, a method of assigning a priority to a service in a PON customer terminal was introduced in Korea Patent Publication No. 2005-0061263.

In the conventional method, a method for providing a service to a customer terminal having a priority and a PON system using the same are introduced. In more detail, a priority is assigned to customer terminals in a PON, and the PON system receives a reservation request message from a customer terminal to request a bandwidth allocation for data transmission. The received reservation request messages are stored in corresponding queues according to the priority of customer terminal that transmit the reservation request messages. Then, the PON system provides requested services to the customer terminals in an order from the reservation request messages stored in the queue having the highest priority to the reservation request messages stored in the queue having lower priority. As described above, a discriminated service can be provided by assigning priorities to predetermined customer terminals.

Also, a method of identifying a customer using an IP address was introduced in Korea Patent Publication No. 2005-0032678. The method includes the steps of: assigning bandwidths to ports of a plurality of customer terminals connected to a service provider terminal and assigning customer levels; allocating a bandwidth by a customer port of a customer terminal based on the bandwidth information; allocating an ID address to the customer port of the customer terminal according to the customer level based on the customer level information; and differently supporting QoS according to the customer level for data transmission between the service provider terminal and the customer terminal using the bandwidth and the IP address.

However, the first conventional method has a problem that a discriminated bandwidth cannot be provided according to the service type because the customer is discriminated by a unit of ONU/ONT. The second conventional method must assign an IP address to a customer port for discrimination. Therefore, the second conventional method must perform annoying processes for mapping the customer port and the IP address, checking the mapped information according to the customer port, and checking the service of the checked customer port whenever the IP address is dynamically allocated through DHCP.

SUMMARY OF THE INVENTION

Accordingly, the present invention is directed to a method for managing service bandwidth by customer port and EPON system using the same that substantially obviates one or more problems due to limitations and disadvantages of the related art.

An object of the present invention is to provide a method of managing a service bandwidth by a customer for allowing various bandwidth controls according to a customer and a service and an Ethernet based passive optical network (EPON) system using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing a service bandwidth by a customer, increases the steps of: allocating a customer identifier to identify a customer by a customer; allocating a service identifier to identify a service by a service type; identifying a service class by combination of the allocated customer identifier and the allocated service identifier; and setting an allowable service bandwidth according to the identified service class.

According to an aspect of the present invention, there is provided an optical network unit (ONU) of an Ethernet based passive optical network (EPON) system including: a customer identification tag tagging unit for finding a customer identifier for an uplink data packet to be transmitted to an optical line terminal (OLT) among customer identifiers allocated by a customer, and inserting the found customer identifier as a customer identification tag; a service classification unit for finding a service identifier of the uplink data packet among service identifiers allocated by a service type by classifying a service type and feature of the uplink data packet; a service identification tag tagging unit for inserting the found service identifier from the service classification unit into the uplink data packet as a service identification tag; a bandwidth control unit for identifying a service class according to the customer identifier and the service identifier of the uplink data packet, and controlling a service bandwidth according to the identified service class; and a link control unit for transmitting the uplink data packet to an optical line terminal (OLT) in response to the control of the bandwidth control unit.

According to another aspect of the present invention, there is provided an optical line terminal (OLT) of an Ethernet based optical passive network (EPON) system, including: a customer information lookup table for storing customer identifiers allocated by a MAC address that is addresses of physical mediums connected to an optical network unit (ONU); a customer identification tag tagging unit for finding a corresponding customer identifier from the customer information lookup table using a destination MAC address of a downlink data packet to be transmitted to an optical network unit (ONU) and inserting the found customer identifier into the downlink data packet as a customer identification tag; a service classification unit for finding a service identifier of the downlink data packet among service identifiers allocated by a service type by classifying a service type of the downlink data packet; a service identification tag tagging unit for inserting the service identifier provided from the service classification unit into the downlink data packet as a service identification tag; a bandwidth control unit for identifying a service class according to a combination of the customer identifier and the service identifier included in the downlink data packet, and controlling a service bandwidth according to the identified service class; and a link control unit for transmitting the downlink data packet to an optical line terminal (OLT) in response to the control of the bandwidth control unit by supporting an Ethernet based packet transmission with the customer terminal.

According to still another aspect of the present invention, there is provided an Ethernet based passive optical network (EPON) system including: more than one of optical network units (ONU) for allocating a service class according to a combination of information about a customer that receives a service, and a service type and a service priority of a service provided to a customer, allocating a bandwidth according to each service class and controlling a uplink bandwidth according to a service class; an optical line terminal for allocating a service class according to a combination of information about a customer that receives a service, and a service type and a service priority of a service provided to a customer, allocating a bandwidth according to each service class and controlling a downlink bandwidth according to a service class; and a system manger for collecting information about a service provider, a service provided from a service provider, a customer that receives a service, and information for classifying a service, and providing the collected information to the ONU and the OLT.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 show a typical Ethernet frame structure.

DETAILED DESCRIPTION OF THE INVENTION

Reference will now be made in detail to the preferred embodiments of the present invention, examples of which are illustrated in the accompanying drawings.

Figure 1:
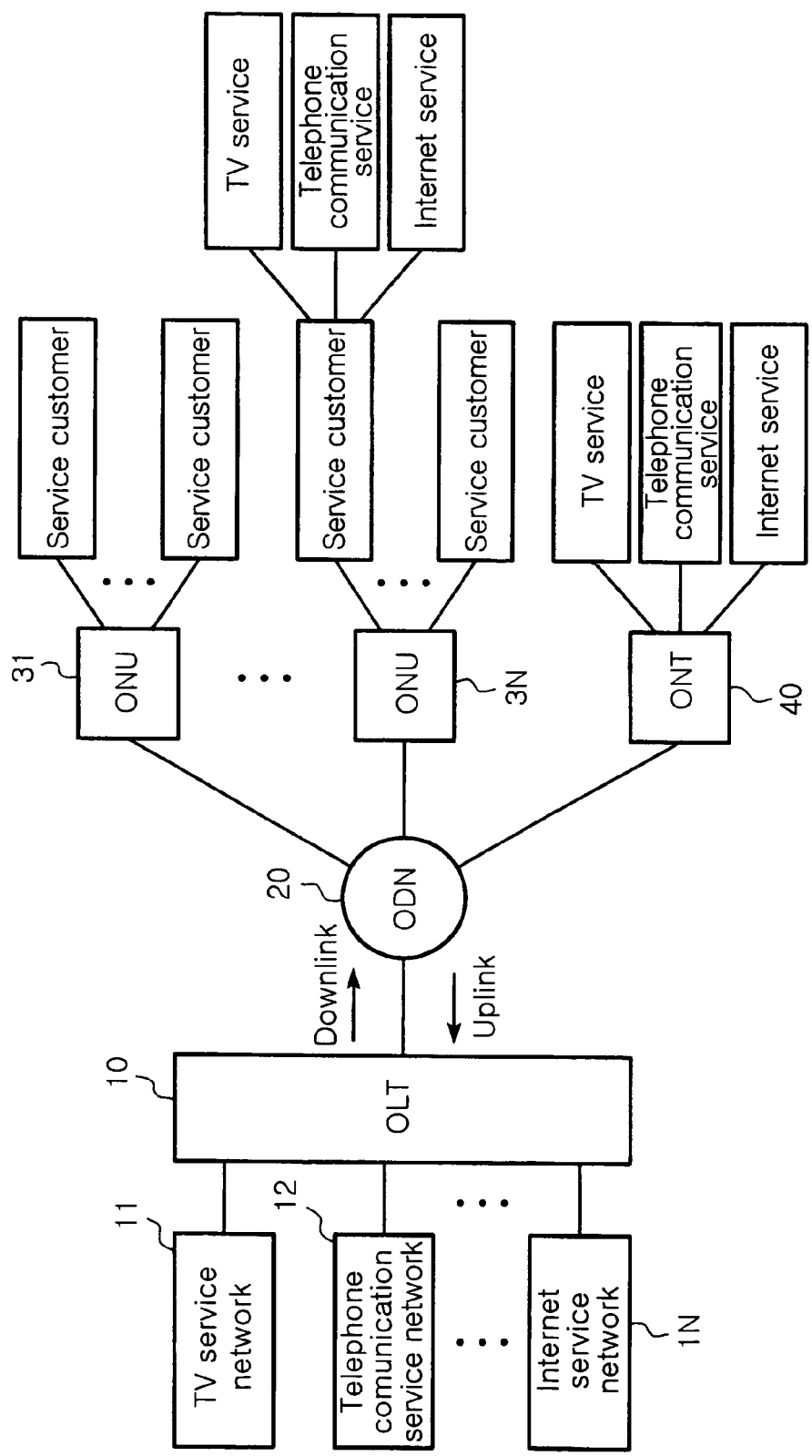
FIG. 1 is a block diagram of a conventional EPON system.
Figure 2:
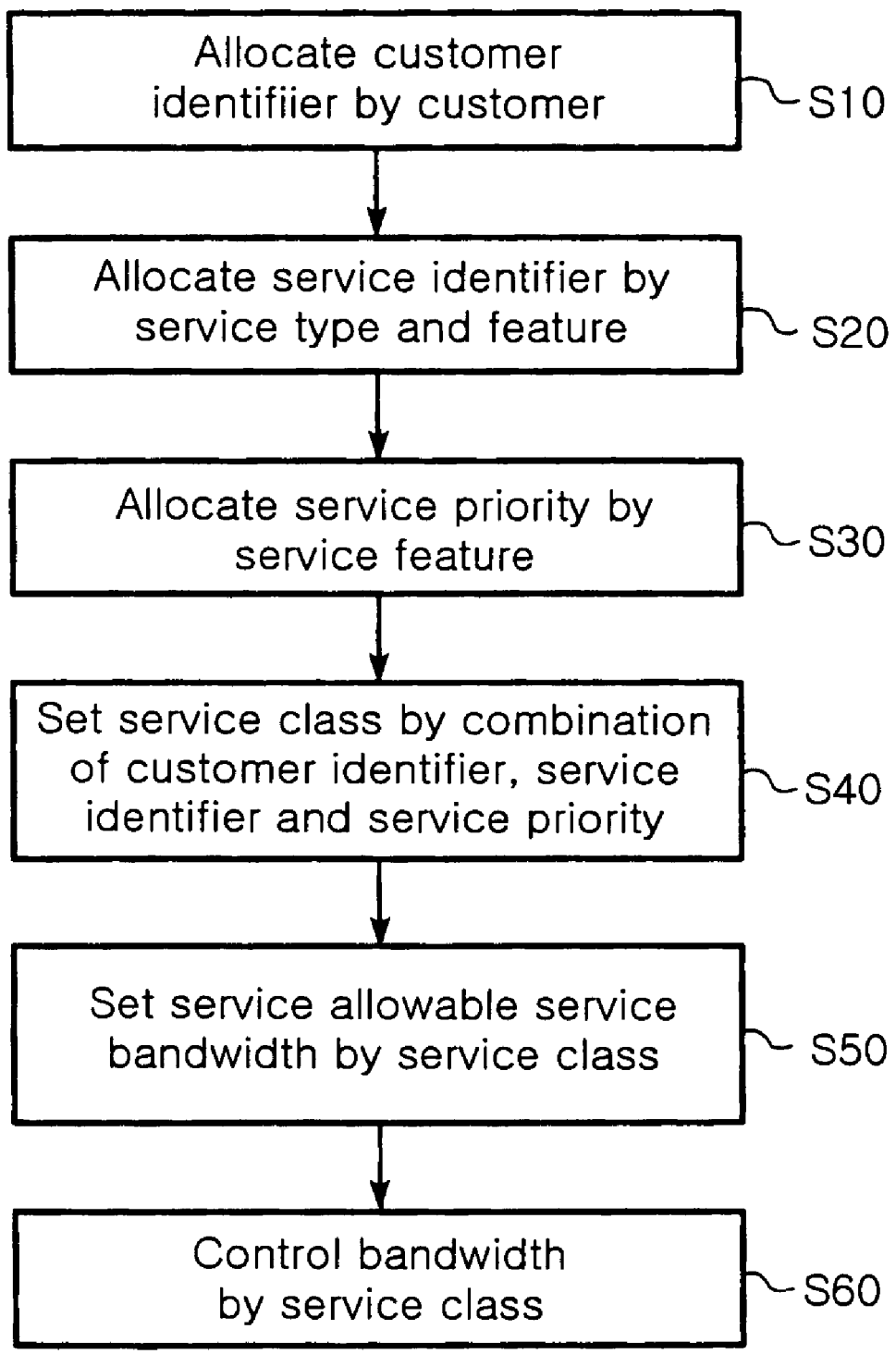
FIG. 2 is a flowchart showing a method of managing a service bandwidth by a customer according to an embodiment of the present invention.

FIG. 2 is a flowchart showing a method of managing a service bandwidth by a customer according to an embodiment of the present invention. The method shown FIG. 2 can be applied into a network system such as an Ethernet passive optical network (EPON) system.

Referring to FIG. 2, customer identifiers are allocated to customers in order to identify the customers at step S10. In case of an optical network unit (ONU), the customer identifiers may be allocated by identifying customers by a customer access port through matching customer access ports to customers in one-to-one manner. In case of an optical network terminal (ONT), since the ONT itself is corresponding to one user equipment, a customer identifier is allocated to the ONT. In case of an optical line terminator (OLT), since customer access port information is unknown, the customer identifiers are allocated by matching the customer identifiers to the MAC addresses of a physical medium transferred to the customer access ports in one-to-one manner.

After allocating the customer identifier, a service identifier is allocated at step S20 to identify a service by its type. The service identifier is allocated by collecting information that can be used to identify the service type of a data packet, classifying the service type using the collected information and allocating a unique service identifier by the classified service type. The information that can be used to identify the service type may include at least one of a MAC address, an IP address, protocol information, priority information and TCP/UDP port information. In the ONT and the ONU, the same method is used for allocating the service identifier. At step S30, a service priority may be additionally allocated to identify a service feature by a service type with the service identifier so as to control bandwidths in many different ways in the present invention. The service priority may use the priority information, which is included in the collected information that can identify the service type for the data packet, as it is. Or, new priority may be allocated by the classified service type.

After allocating the customer identifier, the service identifier and the priority, a service class is set by the combination of the allocated customer identifier, service identifier and service priority at step S40.

Then, an allowable service bandwidth is set according to the set service class at step S50, and the bandwidth of each service class is controlled to be sustained within the set bandwidth at step S60.

At the step S50, the allowable service bandwidth is a bandwidth for a corresponding service, which is defined by an agreement made between a service customer and a service provider.

At the step S60, in order to control the bandwidth by the service class, bandwidth control parameters are set according to the service class, and the bandwidth is controlled using the bandwidth control parameters. The bandwidth control parameters may include at least one of information about measuring a bandwidth according to the service class, an allowable bandwidth set to a corresponding service class, and bandwidth information measured according to service classes. For example, when a packet is input, it compares the bandwidth information measured before the packet invoking the bandwidth control is input and the allowable bandwidth. If the measured bandwidth information is larger than the allowable bandwidth, the corresponding data packet is dropped. On the contrary, if the measured bandwidth information is smaller than the allowable bandwidth, the corresponding data packet is normally processed to be transmitted.

Furthermore, at the step S60, queue buffers are prepared according to combinations of the customer identifiers and the service priorities, respectively, the data packet is stored in a corresponding queue buffer according to the combination of the customer identifier and the service priority, and the queue buffers are scheduled differently according to the service priority. That is, the service bandwidth can be controlled in many different ways in EPON system through scheduling the queue buffers as described above.

Hereinafter, the method of managing a bandwidth according to the present embodiment will be described with reference to the detailed configuration of the EPON system according to the present embodiment and a flowchart thereof.

Figure 3:
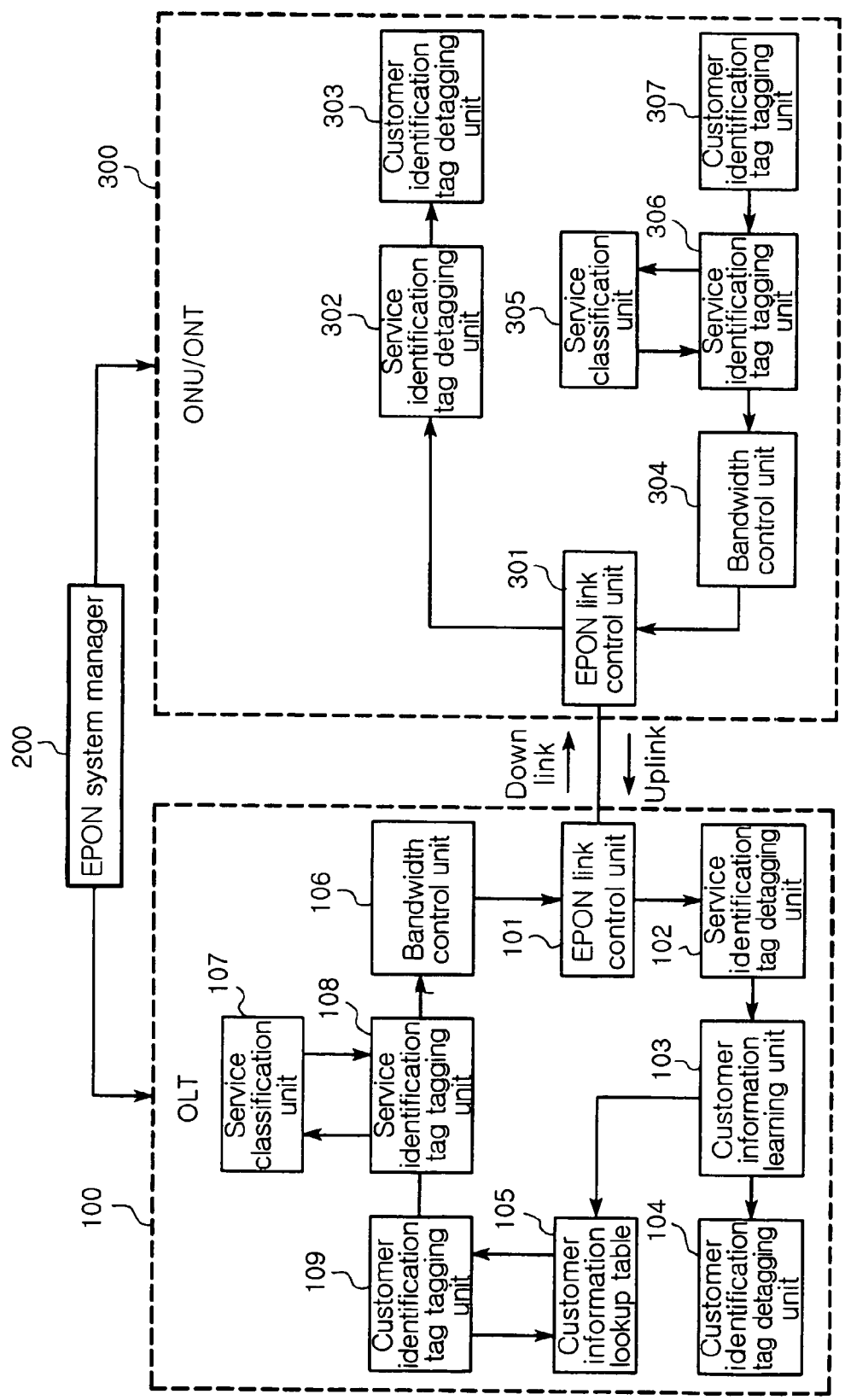
FIG. 3 is a block diagram illustrating an EPON system for managing a service bandwidth by a customer port according to an embodiment of the present invention.

FIG. 3 is a block diagram of an EPON system for managing a service bandwidth by a customer port according to an embodiment of the present invention.

Referring to FIG. 3, the EPON system includes an optical line terminal (OLT) 100, an optical network unit (ONU) or an optical network terminal (ONT) 300, and a system manager 200. The ONU and the ONT are distinguished by where a connection is provided to customer application equipment or not. Hereinafter, they are defined as an ONU for convenience.

The OLT 100 includes an EPON link control unit 110, a service identification tag detagging unit 120, a customer information learning unit 103, a customer identification tag detagging unit 104, a customer information lookup table 105, a bandwidth control unit 106, a service classification unit 107, a service identification tag tagging unit 108, and a customer identification tag tagging unit 109.

The ONU 300 includes an EPON link control unit 301, a service identification tag detagging unit 302, a customer identification tag detagging unit 303, a bandwidth control unit 304, a service classification unit 305, a service identification tag tagging unit 306, and a customer identification tag tagging unit 307.

A customer identification tag according to the present embodiment includes predetermined information about a customer identifier classified by a customer, and a service identification tag includes a service identifier classified by a service type and feature.

Hereinafter, the function of the EPON system according to the present embodiment will be described in detail.

The customer identification tag tagging unit 307 of the ONU 300 finds a customer identifier corresponding to a customer access port receiving a packet with reference to a mapping table as shown in Table 1 when a packet is transferred through a customer access port (not shown) from the ONU.

TABLE 1

| Customer access port | Customer identifier |
| --- | --- |

The service classification unit 305 extracts communication protocol information and a customer identifier from a packet having a customer identification tag which is inserted into the packet by the customer identification tag tagging unit 307. With reference to the mapping table like Table 2, the service classification unit 305 analyzes the extracted communication protocol information, finds previous setting communication protocol information matched with the extracted customer identifier from the mapping table, finds a service identifier and a service priority corresponding to the found previous setting communication protocol information, and transfers the service identifier and the service priority to the service identification tag tagging unit 306.

TABLE 2

| Previous setting communication protocol information | Customer identifier | Service identifier | Service priority |
| --- | --- | --- | --- |

The service identification tag tagging unit 306 inserts the service identifier and the service priority, which are transferred from the service classification unit 305, into a packet in a form of a service identification tag, where the packet has a customer identification tag inserted by the customer identification tag tagging unit 307.

The bandwidth control unit 304 extracts the customer identifier, the service identifier and the service priority from the packet having the customer identification tag inserted by the customer identification tag tagging unit 307 and the service identification tag inserted by the service identification tag tagging unit 306. Then, the bandwidth control unit 304 finds a service class corresponding to the extracted information with reference to a mapping table, for example, Table 3.

TABLE 3

| Customer identifier | Service identifier | Service priority | Service class |
| --- | --- | --- | --- |

With reference the mapping table, for example, Table 3, the bandwidth control unit 304 compares previous-measured bandwidth information which is measured before the packet is transferred and allowable bandwidth information using a bandwidth control parameter corresponding to the service class. Then, the bandwidth control unit 304 drops the packet if the previously-measured bandwidth exceeds the allowable bandwidth. On the contrary, the bandwidth control unit 304 passes the packet if the previously-measured bandwidth does not exceed the allowable bandwidth.

TABLE 4

| Service class | Bandwidth control parameter |
| --- | --- |

Furthermore, the bandwidth control unit 304 measures bandwidths in accordance with a service class at a predetermined interval which is set at the bandwidth control parameter. The bandwidth may be measured by calculating the number of packets passing per a unit time, the number of bytes of packets passing per a unit time, or the number of bits of packets passing per a unit time. It is preferable that the measured bandwidth information may be updated before a new packet is transferred.

Also, the bandwidth control unit 304 stores the packets, not dropped, into corresponding one of a plurality of queue buffers according to a mapping table, for example, Table 5. Herein, the queue buffers are classified by combination of a customer identifier and a service priority related to the packet.

TABLE 5

| Customer identifier | Service priority | Queue buffer |
| --- | --- | --- |

Then, the bandwidth control unit 304 transmits the packets in the queue buffers through the EPON by scheduling the queue buffers according to the service priority information for the service of the customer identified by the customer identifier.

The link control unit 301 transfers a packet from the bandwidth control unit 304 to the link control unit 101 of the OLT 100 through the EPON.

The link control unit 101 of the OLT 100 receives the packet from the link control unit 301 of the ONU 300 and transfers the packet to the service identification tag detagging unit 102.

The service identification tag detagging unit 102 removes the service identification tag, which is inserted by the service identification tag tagging unit 306 of the ONU 300, from the packet transferred from the link control unit 101.

Furthermore, the customer information learning unit 103 of the OLT 100 extracts a customer identifier, which is inserted by the customer identification tag tagging unit 307 of the ONU 300, and a MAC address, which is related to a customer terminal or a service application terminal which generates the packet, from the packet with the service identification tag removed. Herein the MAC address is a source MAC address of the packet. After extracting, the customer information learning unit 103 transfers the customer identifier and the MAC address to the customer information lookup table 105.

The customer information lookup table 105 stores the customer identifier and the MAC address from the customer information learning unit 103 into a mapping table, for example, Table 6.

TABLE 6

| MAC address | Customer identifier |
| --- | --- |

Then, the customer identification tag detagging unit 104 removes the customer identification tag, which is inserted by the customer identification tag tagging unit 307 of the ONU 300, from the packet with the service identifier removed by the service identification tag detagging unit 102.

After removing the customer identification tag and the service identification tag from the packet by the customer identification tag detagging unit 104 and the service identification tag detagging unit 102, the packet is transmitted to a service provider through a service provider access port provided by the OLT 100.

The customer information lookup table 105 extracts a MAC address, which is related to the customer terminal or the service application terminal, from the packet when a packet is transferred through a service provider access port provide by the OLT 100, where the MAC address may be a destination MAC address of the transferred packet. After extracting, the customer information lookup table 105 fins a customer identifier corresponding to the extracted MAC address and transfers the customer identifier to the customer identification tag tagging unit 109.

When a packet is transferred to the customer identification tag tagging unit 109 through the service provider access port provided from the OLT 100, the customer identification tag tagging unit 109 inserts a customer identifier, which is transferred from the customer information lookup table 105, into the packet as a customer identification tag.

The service classification unit 107 extracts communication protocol information and a customer identifier from the packet with the customer identification tag inserted by the customer identification tag tagging unit 109. Then, the service classification unit 107 analyzes the extracted communication protocol information with reference to a mapping table, for example, Table 7, and finds previous setting information in the mapping table, which is matched with the extracted protocol information and customer identifier. Then, the service classification unit 107 finds a service identifier and a service priority corresponding to the found previous setting information and transfers the service identifier and the service priority to the service identification tag tagging unit 108.

TABLE 7

| Previous setting communication protocol information | Customer identifier | Service identifier | Service priority |
|---|---|---|---|

The service identification tag tagging unit 108 inserts the service identifier and the service priority, which are transferred from the service classification unit 107, into the packet with the customer identification tag, which is tagged by the customer identification tag tagging unit 108, as a service identification tag.

The bandwidth control unit 106 extracts the customer identifier, the service identifier and the service priority from the packet with the customer identification tag and the service identification tag, which are tagged by the customer identification tag tagging unit 109 and the service identification tag tagging unit 109. Then, the bandwidth control unit 106 finds a service class corresponding to the extracted information with reference a mapping table, for example, Table 8.

TABLE 8

| Customer identifier | Service identifier | Service priority | Service class |
|---|---|---|---|

The bandwidth control unit 106 compares measured-bandwidth information, which is measured before the packet is transferred and allowable bandwidth information using a bandwidth control parameter corresponding to the service class with reference to a mapping table, for example, Table 9. If the measured bandwidth exceeds the allowable bandwidth, the packet is dropped. On the contrary, if the measured bandwidth does not exceed the allowable bandwidth, the packet is passed.

TABLE 9

| Service class | Bandwidth control parameter |
|---|---|

The bandwidth control unit 106 measures a bandwidth of each service class at a regular interval that is set in the bandwidth control parameter. The bandwidth may be measured by calculating the number of packets passing per a unit time, the number of bytes of packets passing per a unit time, or the number of bits of packets passing per a unit time. It is preferable that the measured bandwidth information according to the service class may be updated before a new packet is transferred.

The bandwidth control unit 106 stores the packet not dropped into a corresponding one of queue buffers according to a mapping relation of a customer identifier field, a service priority field and a queue buffer field. The queue buffers are classified by the customer identifier and the service priority.

Also, the bandwidth control unit 106 schedules the queue buffers according to the service priority information for the service of the customer identified by the customer identifier.

The EPON link control unit 101 transfers the packet from the bandwidth control unit 106 to the ONU 300.

The link control unit 301 of the ONU 300 transfers the packet from the OLT 100 to the service identification tag detagging unit 302.

The service identification tag detagging unit 302 removes the service identification tag, which is tagged by the service identification tag tagging unit 108 from the packet from the link control unit 301. Then, the customer identification tag detagging unit 303 extracts the customer identifier information from the packet with the service identification tag removed. After extracting, the customer identification tag detagging unit 303 finds customer access port information corresponding to the extracted customer identifier information with reference to a mapping table, for example, Table 10, and removes the customer identification tag inserted by the customer identification tag tagging unit 109. After removing, the customer identification tag detagging unit 303 transfers the customer identifier information to a customer access port corresponding to the customer access port information.

TABLE 10

| Customer identifier | Customer access port |
|---|---|

The packet with the service identification tag and the customer identification tag removed by the service identification tag detagging unit 302 and the customer identification tag detagging unit 303 is outputted to a customer side through a customer access port provided from the ONU 300.

Hereinafter, a method of allocating a customer identifier by a customer in an EPON system according to the present embodiment will be described.

A reference of allocating a customer identifier at the ONU 300 may be a customer access port where the customer side access. That is, the customer identifier is allocated by mapping customer access ports and customer identifiers in one-to-one (1:1) manner, and the allocated customer identifier is inserted as a form of a customer identifier tag.

The OLT 100 can obtain MAC address information, which are addresses of physical mediums connected to a customer access port of the ONU 100, and a customer identifier, which is inserted by the ONU 300, from a data packet transferred from the ONU 300. Therefore, a customer identifier can be allocated through identifying a customer for a packet outputted from the EPON by learning the MAC address and the customer identifier from the upstream data packet transferred from the ONU 300.

Hereinafter, a method of tagging a customer identification tag tagging performed in an optical network unit (ONU).

Figure 4:
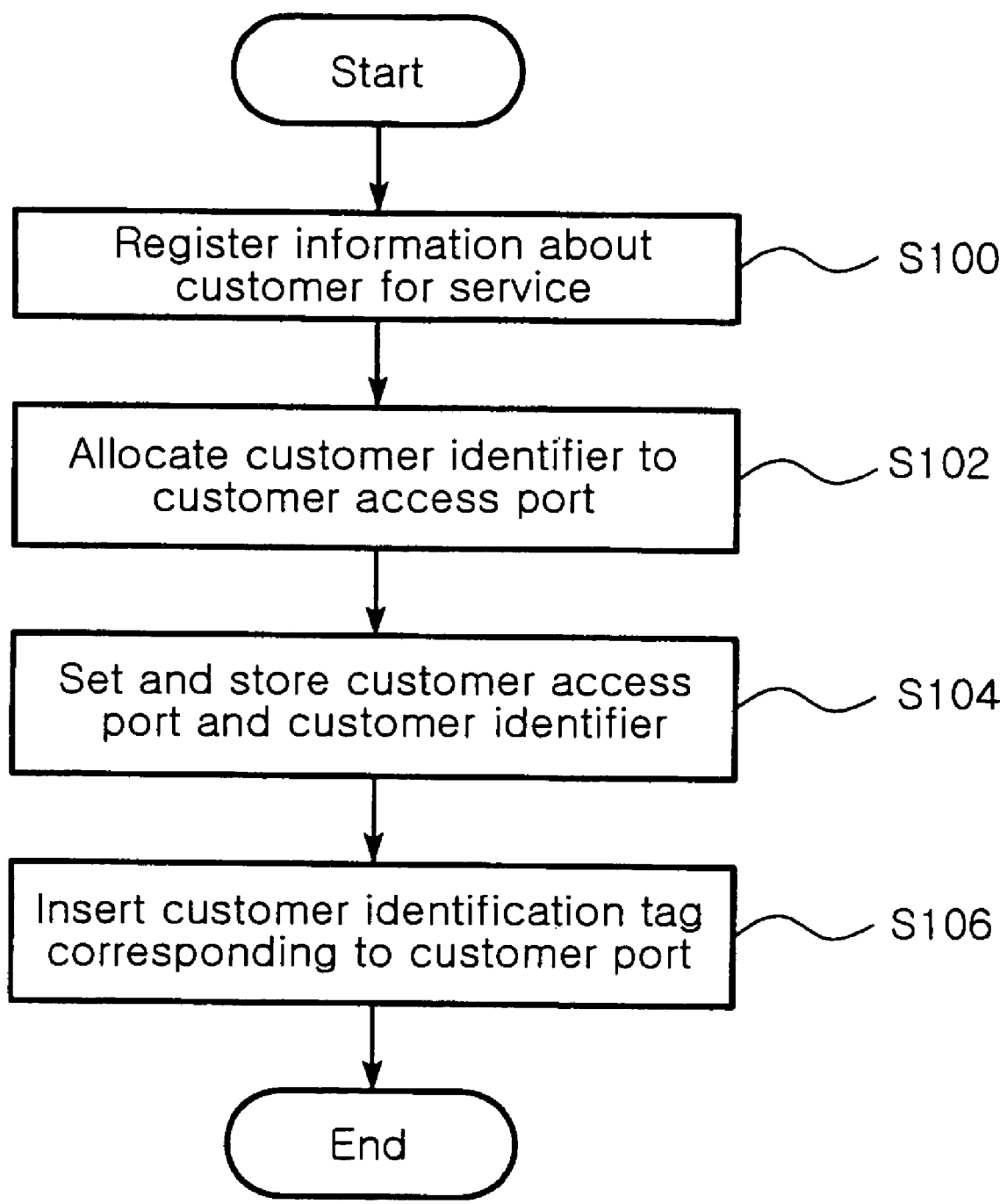
FIG. 4 is a flowchart showing allocation of a customer identifier in an ONU according to an embodiment of the present invention.

FIG. 4 is a flowchart showing allocation of a customer identifier in an ONU according to an embodiment of the present invention.

Referring to FIG. 4, at step S100, a system manager 20 collects and registers information about a customer, who is a target object for a service to provide from a service provider, from the service provider in order to allocate a customer identifier.

From the collected information, the ONU 300 identifies a customer using a customer access port provided for connecting to the customer. That is, ONU/ONT 300 analyzes a customer and a port for accessing the customer as 1:1 relation. But, ONT is classified itself as one customer. By identifying the customer using the customer access port, the customer identifier is allocated at step S120.

At step S120, the customer identifier allocated by the customer is set and stored in a mapping table as a form of a customer access port information field and a customer identification field as shown in Table 1 by the customer identification tag tagging unit 307 of the ONU 300 based on a relation between the customer access port information and the customer identifier.

Then, the allocated customer identifier is inserted into an uplink data packet as a customer identification tag by the customer identification tag tagging unit 307 of the ONU 300, where the uplink data packet is input through the customer access port. Herein, the inserted customer identifier is a customer identifier mapped to a customer access port where the uplink data packet is input.

Figure 5:
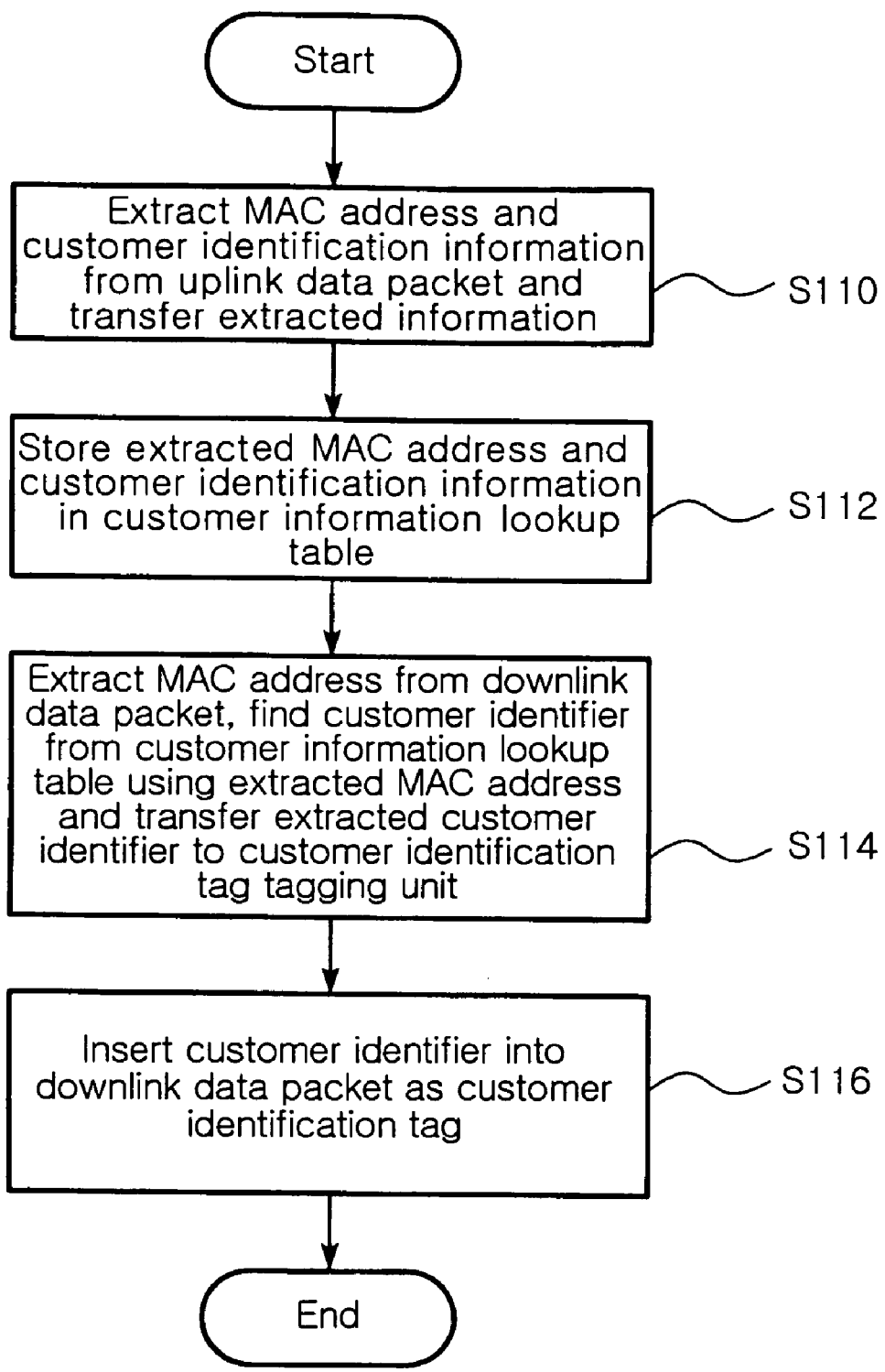
FIG. 5 is a flowchart showing allocating of a customer identifier in an OLT according to an embodiment of the present invention.

FIG. 5 is a flowchart showing allocation of a customer identifier in an OLT according to an embodiment of the present invention.

Referring to FIG. 5, the OLT 100 cannot directly know information about a customer access port. Therefore, the OLT 100 allocates a customer identifier by a customer using information of a packet provided from the ONU 300.

Generally, a data packet includes a destination MAC address, a source MAC address where the packet is generated, a length, a type, data and FCS for error correction as shown in FIG. 10. In case of the uplink data packet, the source MAC address is a MAC address of a customer terminal connected to a customer access port of the ONU 300. In case of the downlink data packet, the destination MAC address is a MAC address of a customer terminal connected to a customer access port of the ONU 300.

That is, in case of the EPON system according to the present embodiment, the uplink data packet includes MAC address information of a physical medium connected to the customer access port and customer identifier information identified by the customer access port.

Therefore, the OLT 100 extracts the information such as the MAC address and the customer identifier from the uplink data packet received through the customer information learning unit 103, transfers the extracted information to the customer information lookup table 105, and storing them at the customer information lookup table 105 by mapping the MAC address to the customer address at steps S110 and S112.

When a downlink data packet is transferred from the service provider, MAC address related to a customer terminal or a service application terminal, that is, a destination MAC address, is extracted from the downlink data packet, and a customer identifier corresponding to the extracted MAC address is found from the customer information lookup table 105 using the MAC address. Then, the found customer identifier is transferred to the customer identification tag tagging unit 109 of the OLT at step S114.

After transferring, the customer identifier found from the customer information lookup table 105 is inserted into the downlink data packet as a customer identification tag by the customer identification tag tagging unit 109 at step S116.

Figure 6:
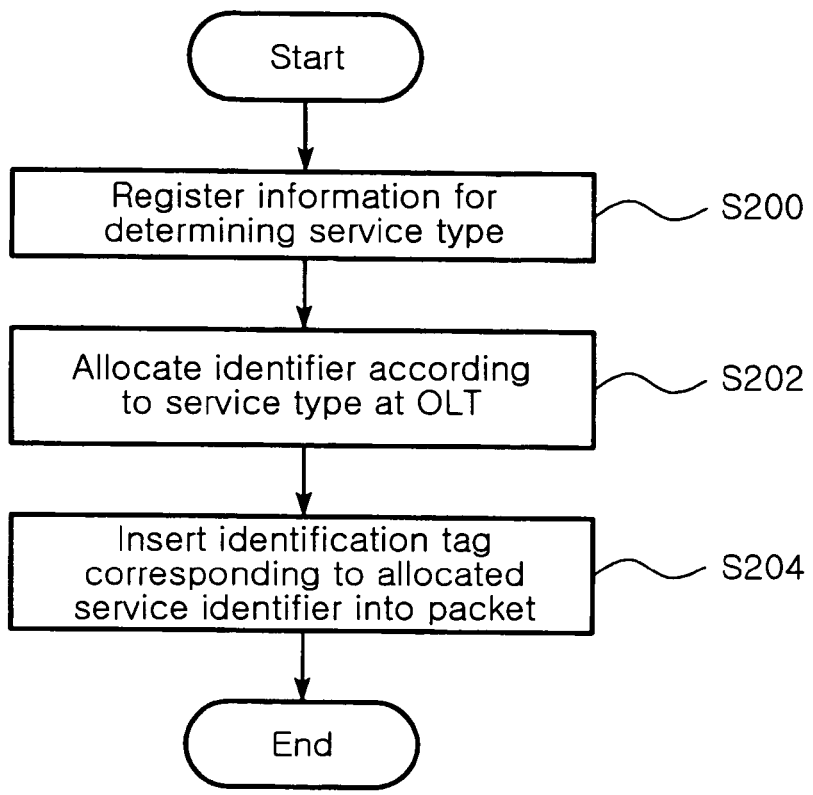
FIG. 6 is a flowchart of a service identification allocation in an optical line terminal (OLT) according to an embodiment of the present invention.

The service identification information according to the present invention includes at least one of a service identifier and a service priority. The service identification information is allocated after being classified by a service type and feature, and inserted into a data packet. With reference to FIGS. 5 and 6, the service identifier allocation will be described in more detail.

FIG. 6 is a flowchart showing a service identification allocation in an optical line terminal (OLT) according to an embodiment of the present invention.

Referring to FIG. 6, a system manager 200 that manages the EPON system according to the present embodiment collects information such as a MAC address, an IP address, a protocol, a priority, and TCP/UDP port information for determining the service type of a data packet and registers the collected information at step S200.

The OLT 100 classifies the service types using the collected and registered information and allocates a service identifier according to the service type at step S202. When a service identifier is allocated, a service priority included in the collected information may be used as the service priority or new priority may be register and stored with the service identifier.

When a downlink service, the service classification unit 107 of the OLT sets and stores previous setting information of various communication protocols for service identification, a customer identifier for the customer identification method, a service identifier used to identify a service, and a service priority in a form of a previous-setting communication protocol information field, a customer identifier field, a service identifier field, and a service priority field in the mapping table.

When the data packet is input after storing the information in the mapping table, information is extracted from the data packet to analyze the service type. Than, a corresponding service identifier or a service priority is detected from the mapping table using the extracted information. After detecting the service identifier or the service priority, the service identifier or the service priority is inserted into a corresponding data packet at step S204.

The aforementioned steps are performed for a downlink service from the OLT 100 to the ONU 300. However, it can be identically applied to the uplink service from the ONU 300 to the OLT 100.

Figure 7:
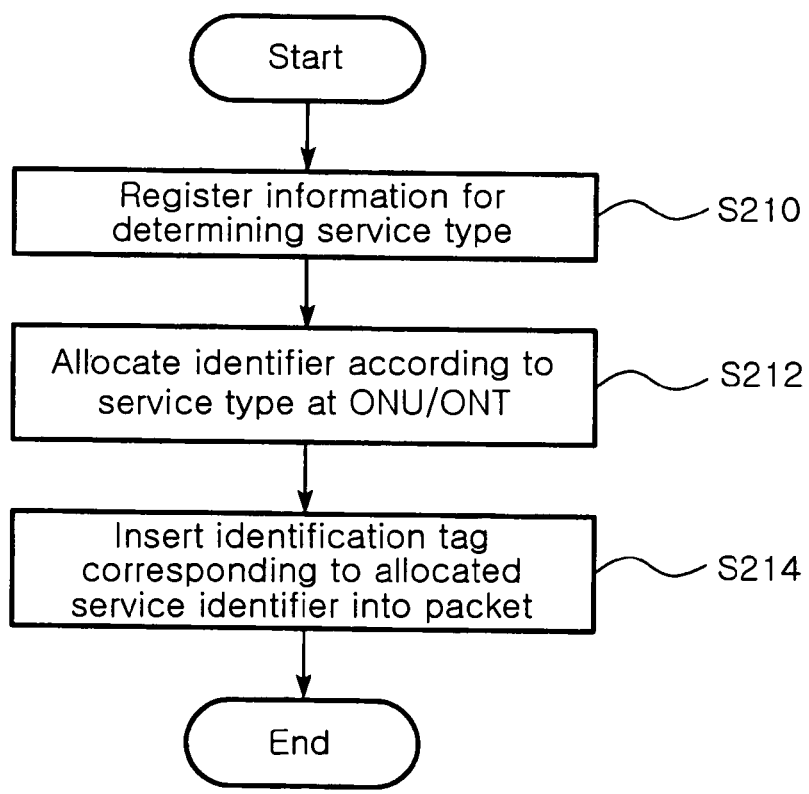
FIG. 7 is a flowchart showing allocation of a service identifier in an ONU according to an embodiment of the present invention.

FIG. 7 is a flowchart showing allocation of a service identifier in an ONU according to an embodiment of the present invention.

Referring to FIG. 7, the system manager 300 collects and registers information for determining a service type of a data packet at step S210. The information may include information about a MAC address, an IP address, a protocol, and an TCP/UDP port. Then, a service type is identified using the collected and registered information, and a service identifier is allocated according to the identified service type at step S212. When a service identifier is allocated, a priority included in the collected information may be used as a corresponding service priority, or a new service priority may be assigned. Then, the service priority is registered and stored with the service identifier. That is, the service classification unit 305 of the ONU 300 sets and stores previous setting information of various communication protocols for classifying and analyzing the service, a customer identifier for the customer identification method, a service identifier used to identify a service, and a service priority in a form of a previous-setting communication protocol information field, a customer identifier field, a service identifier field, and a service priority field in the mapping table.

When an uplink data packet is input, information is extracted from the packet to analyze a service type, finds a service identifier by searching the mapping table using the extracted information, and the found service identifier is inserted into the corresponding data packet as a service identification tag at step S214. Herein, the service priority is also inserted with the service identifier.

As described above, a service class is allocated by a combination of an allocated customer identifier, service identifier and service priority, and the bandwidth can be controlled according to the service classes in the present invention.

For example, a service class may be defined as follows. If a customer identifier is 1, a service identifier 2 and a service priority is 7, a service class is defined as 4. If a customer identifier is 1, a service identifier 3 and a service priority is 6, a service class is defined as 4. If a customer identifier is 1, a service identifier 4 and a service priority is 5, a service class is defined as 3.

After the service class is defined as described above, the bandwidth can be controlled differently according to the service class. For example, the bandwidth is controlled by assigning an allowable bandwidth as 8 if the service class is 4, or assigning an allowable bandwidth as 7 if the service class is 3. The bandwidth by the service class may be decided by customer information for a service provided from a service provider and contract information related to a service bandwidth or a quality which is made between a service provider and a customer.

Hereinafter, a method of controlling a bandwidth by a service class will be described with reference to accompanying drawings.

Figure 8:
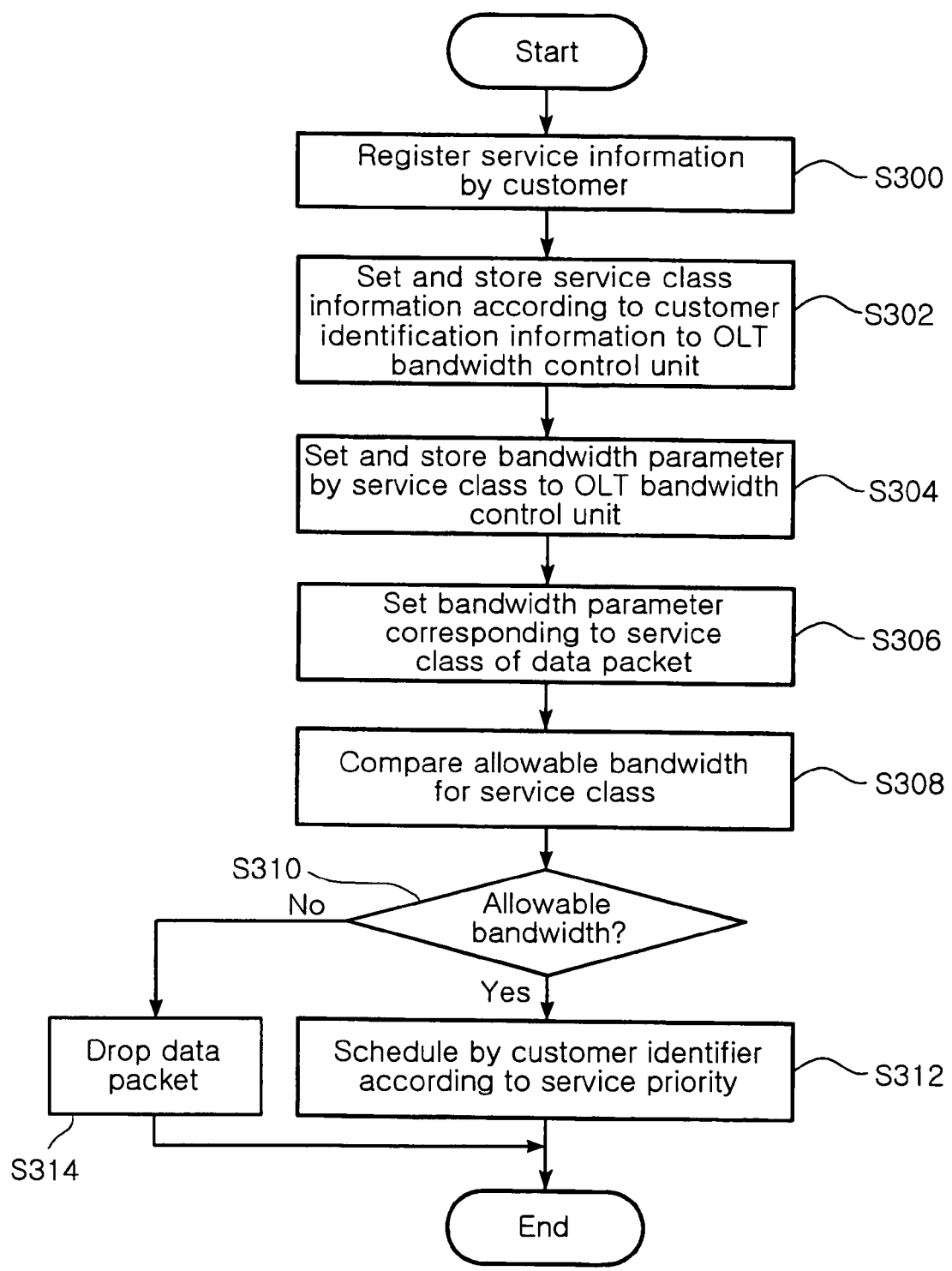
FIG. 8 is a flowchart showing a method of controlling a bandwidth by a service class in an OLT according to an embodiment of the present invention.

FIG. 8 is a flowchart showing a method of controlling a bandwidth by a service class in an OLT according to an embodiment of the present invention.

Referring to FIG. 8, customer information and contract information are collected and registered through a system manager 200 at step S300. Herein, the customer information is information about a customer that is a target object for a service provided from a service provider, and the contract information is information about an agreement related a service bandwidth or quality, which is made between the service provider and the customer.

The bandwidth control unit 106 of the OLT 100 includes a mapping table, and sets and stores relation between a customer identifier, a service identifier, a service priority, and a service class identified by a combination of the customer identifier, the service identifier, the service priority as a form of a customer identifier field, a service identifier field, a service priority field and a service class field in the mapping table at step S3020.

Also, the bandwidth control unit 106 of the OLT 100 includes a bandwidth control rule table, and sets and stores relation between the identified service class and a bandwidth control parameter related to the control of a bandwidth registered corresponding to a service having the service class as a form of a service class field and a bandwidth control parameter field at step S304. The bandwidth control parameter includes measurement information for collecting a real bandwidth of a corresponding service, allowable bandwidth information about an allowable bandwidth allocated to a corresponding service and measured bandwidth information which is a bandwidth measured before a data packet of a corresponding service class is input. Also, the bandwidth control 106 of the OLT 100 may include queue buffers according to a combination of a customer identifier field and a service priority field.

When a downlink packet is input, the bandwidth control unit 106 of the OLT 100 extracts customer identification information, service identification information and priority information from the downlink packet. Using the extracted information, the bandwidth control unit 106 finds a service class from the customer identifier field, the service identifier field, the service priority field and the service class field mapping table. Then, the control unit 106 finds a bandwidth control parameter related to the service class from the bandwidth control rule table using the found service class at step S306.

The control unit 106 compares the measured bandwidth information and the allowable bandwidth information which are included in the bandwidth control parameter at step S308. As described above, the measured bandwidth information is about a bandwidth measured before a corresponding packet is input. If the measure bandwidth exceeds the allowable bandwidth at step S310, the current packet is dropped at step S314. If not, the current packet is passed. Herein, the passed packet is stored in a queue buffer according to a combination of a customer identifier field and a service priority field related to the packet, and the queue buffers are scheduled according to the service priority information at step S112.

The bandwidth for the service class may be measured by calculating the number of packets passing per a unit time, the number of bytes of packets passing per a unit time, or the number of bits of packets passing per a unit time. It is preferable that the measured bandwidth information may be updated before a new packet is transferred.

Figure 9:
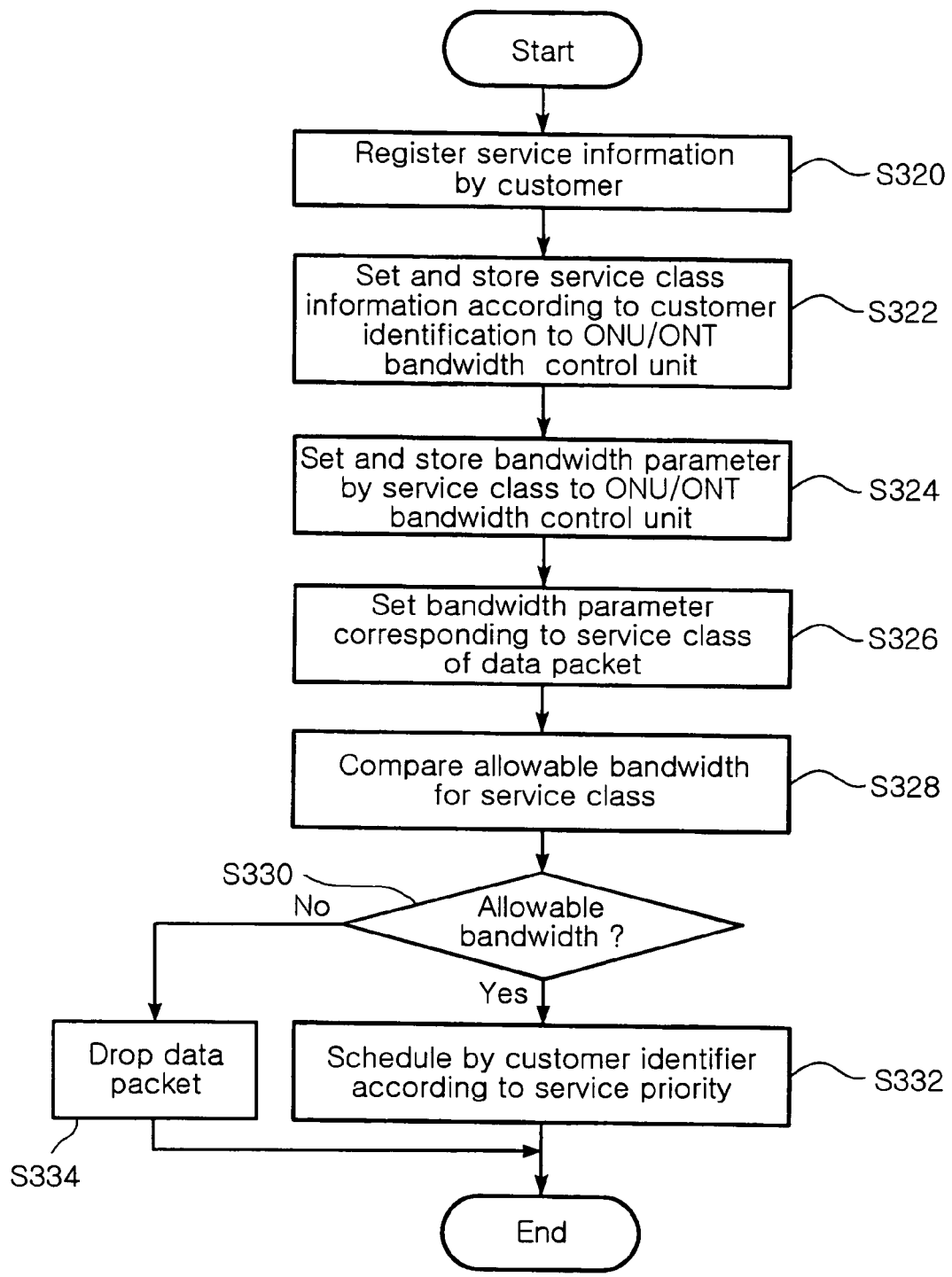
FIG. 9 is a flowchart showing a method of controlling a bandwidth by a service class in an ONU according to an embodiment of the present invention.

FIG. 9 is a flowchart showing a method of controlling a bandwidth by a service class in an ONU according to an embodiment of the present invention. The bandwidth controlling method in the ONU is similar to the bandwidth controlling method in the OLT. However, they are distinguished by the target service, which is an uplink service for the bandwidth controlling method in the ONU.

Referring to FIG. 9, the system manager 200 receives customer information and contract information from the service provider and registers the received information at step S320. Herein, the customer information includes information about a customer which is an object of a service to be provided from a service provider, and the contract information includes information about agreement related a service bandwidth and a quality which made between the customer and the service provider. The bandwidth control unit 304 of the ONU 300 includes a mapping table at step S322, where the mapping table stores information about the customer identifier, the service identifier and the service priority, the service classes and the relation between the service classes and the combination of the customer identifier, the service identifier and the service priority in a form of the customer identifier field, the service classifier field, the service priority field and the service class field using the registered information, the customer identification information, the service identifier and priority information.

Also, the bandwidth control unit 304 includes a bandwidth control rule table, and sets and stores the relation between the service class and the bandwidth control parameter as a form of a service class field and a bandwidth control parameter at step S324.

Furthermore, the bandwidth control unit 304 may include queue buffers according to combination of a customer identifier field and a service priority field using the customer identifier, the service identifier and the service priority.

When an uplink data packet is input, the bandwidth control unit 304 extracts a customer identifier, a service identifier and a service priority from the packet, finds a service class of the packet using the extracted information including the customer identifier, the service identifier and the service priority, and finds a bandwidth control parameter related to the service class from the bandwidth control rule table at step S326. The bandwidth control parameter includes the allowable bandwidth, the measurement information about the bandwidth a corresponding service class and currently-measured bandwidth information about the bandwidth of the corresponding service.

Therefore, the bandwidth is controlled using the bandwidth control parameter. That is, the measured bandwidth information, which is a bandwidth measured before the packet input, is compared to the allowable bandwidth information at step S328. If the measured bandwidth exceeds the allowable bandwidth, the currently transferred packet is dropped. If not, the packet is passed for the uplink transmission at steps S330, S332 and S334. The bandwidth of the service class may be measured by calculating the number of packets passing per a unit time, the number of bytes of packets passing per a unit time, or the number of bits of packets passing per a unit time. It is preferable that the measured bandwidth information may be updated before a new packet is transferred.

Furthermore, the passed packet is stored in a queue buffer corresponding to a combination of the customer identifier and the service priority related to the packet, and the queue buffers are scheduled according to the service priority information at step S330.

As described above, using the method of managing the bandwidth according to the present invention, customers can be more clearly managed by identifying the customer access ports provided from the ONU/ONT by a customer. Also, the service bandwidth can be dynamically controlled in many different ways according to the customer and the service type. As a result, the limited service bandwidth provided from the EPON system can be effectively managed according to the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical network unit (ONU) of an Ethernet based passive optical network (EPON) system, comprising:
   a customer identification tag tagging unit for finding a customer identifier for an uplink data packet to be transmitted to an optical line terminal (OLT) among customer identifiers allocated by a customer, and inserting the found customer identifier as a customer identification tag;
   a service classification unit for finding a service identifier of the uplink data packet among service identifiers allocated by a service type by classifying a service type and feature of the uplink data packet;
   a service identification tag tagging unit for inserting the found service identifier from the service classification unit into the uplink data packet as a service identification tag;
   a bandwidth control unit for identifying a service class according to the customer identifier and the service identifier of the uplink data packet, and controlling a service bandwidth according to the identified service class; and
   a link control unit for transmitting the uplink data packet to an optical line terminal (OLT) in response to the control of the bandwidth control unit;
   wherein the customer identification tag tagging unit includes a mapping table composed of a customer access port field and a customer identifier field, and finds a customer identifier corresponding to a customer access port where a corresponding uplink data packet is input.

2. The ONU of claim 1, further comprising:
   a customer identification tag detagging unit for removing a customer identification tag from a downlink data packet transferred from an optical line terminal (OLT) through the link control unit; and
   a service identification tag detagging unit for removing a service identification tag from the downlink data packet and transferring the downlink data packet to a customer.

3. The ONU of claim 1, wherein the service classification unit further searches a service priority by a service type and a service feature for a service of an uplink data packet, and wherein the service identification tag tagging unit inserts a service priority with the service identifier into an uplink data packet as a service identification tag.

4. The ONU of claim 3, wherein the bandwidth control unit includes a mapping table in a form of a customer identifier field, a service identifier field, a service priority field, and a service class field.

5. The ONU of claim 1, wherein the service classification unit includes a mapping table including more than two fields of a previous-setting communication protocol information field, a customer identifier field, a service identification field and a service priority field.

6. The ONU of claim 1, wherein the bandwidth control unit includes a bandwidth rule table that describes a bandwidth control parameter according to a service class, and controls a bandwidth according to a service class using the bandwidth control parameter described in the bandwidth rule table.

7. The ONU of claim 6, wherein the bandwidth control parameter includes more than one of information about a service class based bandwidth measuring and processing, allowable bandwidths set according to corresponding service classes, and information about measured bandwidths of service classes.

8. The ONU of claim 6, wherein the bandwidth control unit compares a previously-measured bandwidth of a service class of an uplink data packet, which is measured before the uplink data packet is transferred, and an allowable bandwidth of a corresponding service class, and drops the corresponding data packet if the previously-measured bandwidth exceeds the allowable bandwidth, or transmits the corresponding uplink data packet if the previously-measured bandwidth does not exceed the allowable bandwidth.

9. The ONU of claim 6, wherein the bandwidth control unit prepares queue buffers distinguished by combinations of the customer identifier and the service priority, stores the uplink data packet to a corresponding queue buffer according to a combination of a customer identifier and a service priority, and schedules the queue buffers according to the service priority.

10. An optical line terminal (OLT) of an Ethernet based optical passive network (EPON) system, comprising:
- a customer information lookup table for storing customer identifiers allocated by a media access control (MAC) address that is addresses of physical mediums connected to an optical network unit (ONU);
- a customer identification tag tagging unit for finding a corresponding customer identifier from the customer information lookup table using a destination MAC address of a downlink data packet to be transmitted to an optical network unit (ONU) and inserting the found customer identifier into the downlink data packet as a customer identification tag;
- a service classification unit for finding a service identifier of the downlink data packet among service identifiers allocated by a service type by classifying a service type of the downlink data packet;
- a service identification tag tagging unit for inserting the service identifier provided from the service classification unit into the downlink data packet as a service identification tag;
- a bandwidth control unit for identifying a service class according to a combination of the customer identifier and the service identifier included in the downlink data packet, and controlling a service bandwidth according to the identified service class;
- a customer information extracting unit for extracting a source MAC address and a customer identifier from an uplink data packet received through the link control unit, and updating the customer information lookup table using the extracted MAC address and customer identifier; and
- a link control unit for transmitting the downlink data packet to an optical line terminal (OLT) in response to the control of the bandwidth control unit by supporting an Ethernet based packet transmission with the customer terminal.

11. The OLT of claim 10, further comprising:
- a customer identification tag detagging unit for removing a customer identification tag from an uplink data packet transferred from an optical network unit (ONU) through the link control unit; and
- a service identification tag detagging unit for removing a service identification tag from the uplink data packet.

12. The OLT of claim 10, wherein the service classification unit further searches a service priority by a service type and a service feature for a service of an uplink data packet, and
- wherein the service identification tag tagging unit inserts a service priority with the service identifier into an uplink data packet as a service identification tag.

13. The OLT of claim 12, wherein the service classification unit includes a mapping table including more than two fields of a previous-setting communication protocol information field, a customer identifier field, a service identification field and a service priority field.

14. The OLT of claim 10, wherein the bandwidth control unit includes a bandwidth rule table that describes a bandwidth control parameter according to a service class, and controls a bandwidth according to a service class using the bandwidth control parameter described in the bandwidth rule table.

15. The OLT of claim 14, wherein the bandwidth control parameter includes more than one of information about a service class based bandwidth measuring and processing, allowable bandwidths set according to corresponding service classes, and information about measured bandwidths of service classes.

16. The OLT of claim 15, wherein the bandwidth control unit compares a previously-measured bandwidth of a service class of a downlink data packet, which is measured before the uplink data packet is transferred, and an allowable bandwidth of a corresponding service class, and drops the corresponding data packet if the previously-measured bandwidth exceeds the allowable bandwidth, or transmits the corresponding downlink data packet if the previously-measured bandwidth does not exceed the allowable bandwidth.

17. The OLT of claim 16, wherein the bandwidth control unit prepares queue buffers distinguished by combinations of the customer identifier and the service priority, stores the uplink data packet to a corresponding queue buffer according to a combination of a customer identifier and a service priority, and schedules the queue buffers according to the service priority.

18. An Ethernet based passive optical network (EPON) system comprising:
- more than one of optical network units (ONU) for allocating a service class according to a combination of information about a customer that receives a service, and a service type and a service priority of a service provided to a customer, allocating a bandwidth according to each service class and controlling a uplink bandwidth according to a service class;
- an optical line terminal for allocating a service class according to a combination of information about a customer that receives a service, and a service type and a service priority of a service provided to a customer, allocating a bandwidth according to each service class and controlling a downlink bandwidth according to a service class; and
- a system manager for collecting information about a service provider, a service provided from a service provider, a customer that receives a service, and information for classifying a service, and providing the collected information to the ONU and the OLT;
- wherein the ONU and the ONT set an allowable bandwidth by a service class and control data packet transmission to be sustained within the allowable bandwidth.

19. The EPON system of claim 18, wherein the ONU and the ONT include a plurality of queue buffers which are distinguished by a combination of customers and a service priority, store a data packet into a queue buffer corresponding to a combination of a customer and a service priority of the data packet, and schedules the queue buffers according to a priority.

20. The EPON system of claim 19, wherein the ONU identifies a customer using a customer access port.

21. The EPON system of claim 19, wherein the OLT identifies a customer using a MAC address of a physical medium connected to an ONU.

* * * * *